Nov. 19, 1946.   R. G. MILLER   2,411,285
LOW INFLATION ALARM FOR VEHICLE TIRES
Filed Nov. 22, 1944
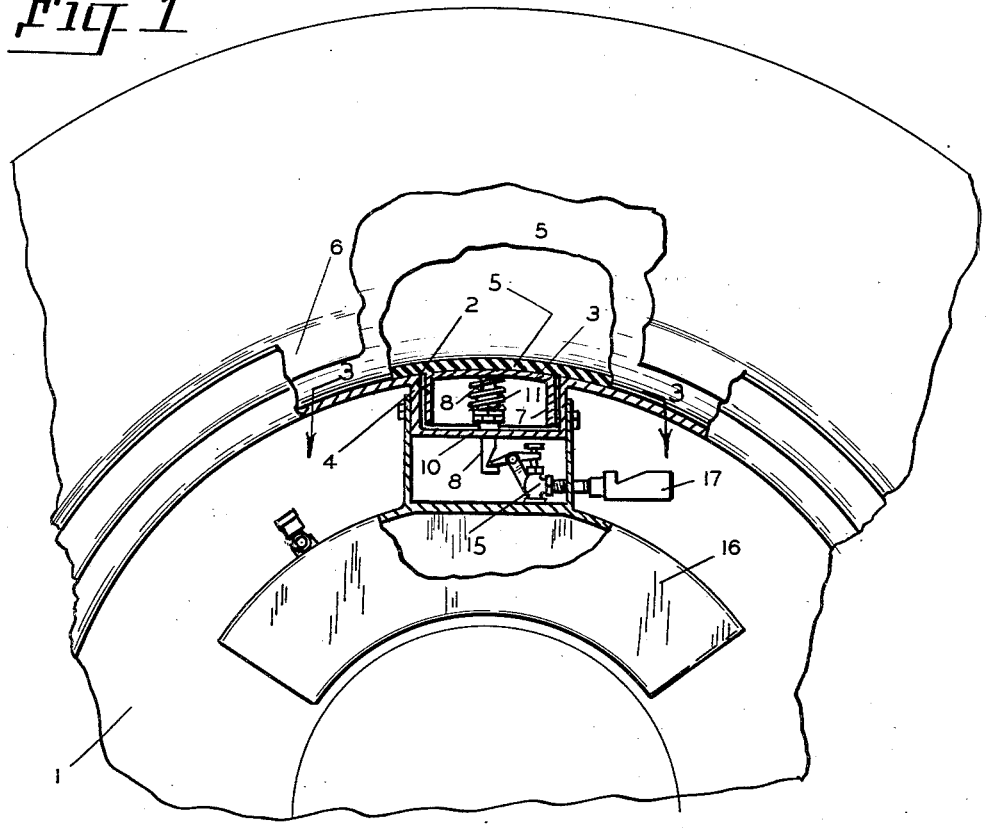
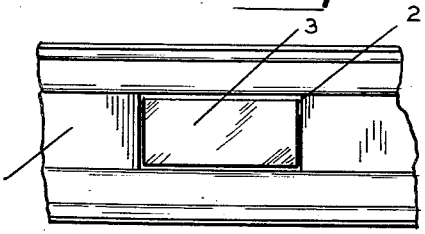
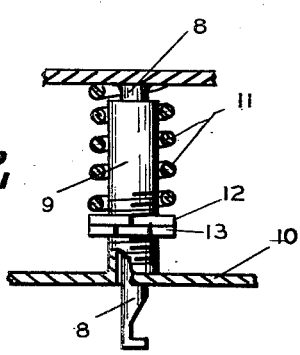
INVENTOR.
RICHARD G. MILLER
BY
ATTORNEY Patented Nov. 19, 1946

2,411,285

UNITED STATES PATENT OFFICE 2,411,285

LOW INFLATION ALARM FOR VEHICLE TIRES

Richard G. Miller, Milwaukie, Oreg.

Application November 22, 1944, Serial No. 564,653

6 Claims. (Cl. 116—34)

This invention relates to an audible alarm device that is responsive to impaired inflation pressure in an pneumatic tire.

It may be regarded as standard practice to equip heavy load vehicles with dual tires on their rear axles as in no other way can the necessary traction, support for a tonnage of pay load that will make the vehicle a paying investment, be attained.

Simply mounting two tires side by side on a suitably built wheel structure is not enough, because for one reason, if the tires are not of the same diameter within very close limits, the big one of the pair carries practically the whole load and shortly fails. It is also dangerous to drive unless the inflation is kept the same and drivers are supposed to inspect all tires regularly after a comparatively moderate mileage. So critical is the condition that a new casing cannot be mounted on the same dual wheel with a somewhat worn one.

The dual tire does not produce the "feel" that a soft single tire does, nor tend to slue the load when one softens. Being, in many instances, on the rear end of a tractor-trailer combination, no satisfactory means has so far been devised that will warn the driver of a vehicle that one of a pair of dual tires on the rear of his vehicle is losing inflation pressure, before a considerable damage has been done.

It is the object of the present invention to provide each tire with means for sounding an audible alarm when the inflation pressure decreases towards the danger point.

It is a further object to make the alarm device for each wheel, self-contained, on the individual wheel, without electrical contacts, wiring, commutators or anything that can be torn off by less than a wreck that will of itself put the vehicle out of service.

Since there is proportionately more unoccupied space between the tire supporting rim and the wheel hub of a truck wheel than anywhere else on such a vehicle, I propose to mount a high pressure gas reservoir in some of that space, taking due care of wheel balance, charge it with air under high pressure, or if preferred by filling it from one of the commercially available steel capsules charged with carbon dioxide gas, to provide the reservoir with a shrill whistle or other distinctive and effective noise maker; place a control valve between the reservoir and the noise maker and a valve operating device effective to open the valve, responsive to impairing inflation pressure within the tire protected, approaching the danger point. Then a microphone, a speaking tube or other well known sound transmitting artifice can be positioned clear of the spinning wheel and protected from mud or dust, to carry the sound to the cab if it is not heard otherwise. If a whistle is used, as preferred, it will of course be placed on one side of the hub and beneath the rim. When such a whistle opens up, it emits a banshee wail, due to being revolved below the hub and reappearing again on the other side, that leaves nothing to guess work.

A drawing accompanies and forms a part of this specification, in which the mechanical principle is shown embodied in a structure that has an inherent law of operation that completely satisfies the objects stated. The drawing illustrates the invention, which may be briefly stated as a low inflation alarm for each individual wheel that it seems expedient to so equip. The alarm consists essentially of a storage flask for high pressure gas (which includes air), a noise maker that operates when the gas is used by operation of the device and a movable operator for using the gas, that is responsive to impaired inflation pressure in the tire to be protected.

In the drawing:

Fig. 1 is a portion of a tire mounted on a portion of a wheel, the tire being broken away to show the inner tube and the invention is mounted in operative relationship to the tire, some parts being sectioned as hereinafter explained;

Fig. 2 is an enlarged view of the member sensitive to low inflation pressure within the tube; and Fig. 3 is a somewhat enlarged section taken on the line 3—3 in Fig. 1, the tube being omitted.

The drawing shows the invention used with the drop-center rim which has been provided with a rectangular aperture 2, within which a guided plate 3 is neatly fitted, the same being supported by a drop hanger 4, which has been welded to the inside of the rim 1. The inner tube 5 bears against this plate 3 just the same as it does against the inner surface of the drop center rim 1 below the tire casing 6, which rests in its proper groove above the mechanism described. The drop center rim is shown because of its practically universal adoption for all types of pneumatic tired wheels except bicycles.

The plate 3, as shown, will be fitted into the aperture 2, so finely as to exclude grit and the lines of contact with the aperture 2 will be sealed by the tube 5. The plate 3 has downturned edges in the form of a rectangular cup, indicated by numeral 7, which will work smoothly within the drop hanger 4, and it also includes a central stem member 8 made integral with the plate 3, which works through a tube 9, made integral with the bottom member 10 of the drophanger 4. A heavy coil spring 11, exerts an upward pressure against the plate 3, as clearly shown in Fig. 2, and will be adjusted by the nut and locknut 12 and 13 respectively to such impressed compression of the spring 11 that the latter will respond promptly if the inflation pressure within the tube 5 falls below a predetermined minimum pressure.

If and when the plate 3 moves toward the tube 5 due to yielding of the tube, the stem 8 will open the valve 15, allowing the high pressure gas in the reservoir 16 to blow the whistle 17, thus producing a loud noise notifying all within audible reach that the tire needs attention.

Means for directly conveying the sound from a point adjacent the wheel to the cab of the vehicle may be deemed expedient but are not shown because no part of the present invention; but if the alarm is well made and charged, it can be heard for more than a half mile.

The reservoir 16 is shown as a segment of an annular ring shaped tank but that is to indicate its presence only and not to define its construction.

Having fully disclosed my invention so that it can be easily understood, made and used by the art, what I claim as new and desire to secure by Letters Patent is:

1. A low pressure alarm system for a pneumatic inner tube tire being used on a road wheel, comprising a gas reservoir carried by said wheel, a whistle mounted near said reservoir, operating connections between the reservoir and whistle, a valve in said operating connections, a member pressed against the inner tube by a spring, said member effective to open the valve and sound the whistle when the tube pressure falls to a point where it yields to the spring.

2. A low inflation pressure alarm for a vehicle tire mounted on a wheel comprising a high pressure gas reservoir carried by the wheel, a gas charge therein, an audible alarm connected to said reservoir, a valve between said reservoir and said alarm and resilient valve operating means responsive to a lowering of inflation pressure within the tire below a predetermined amount to open said valve.

3. In a low inflation alarm structure for a pneumatic tire effective to sound an audible alarm when low inflation occurs, a gas reservoir for mounting on a wheel between the tire and the wheel hub, means for charging the reservoir with high pressure gas, an audible alarm operable by gas pressure, a valve between the alarm and the reservoir and resilient means responsive to partial yielding of the tire due to loss of inflation pressure therein and then effective to operate the valve to sound the alarm.

4. A low-pressure alarm for a pneumatic tired wheel, comprising a gas reservoir carried between the tire and hub, an outwardly movable plate forming support for a part of the air carrying portion of the tire, resilient means tending to move said plate against said air carrying portion that are dormant when a safe air pressure exists in said tire, an audible alarm connected to said reservoir, a control valve for said alarm and operating means between said plate and said valve, making the alarm responsive to impaired pneumatic pressure within said tire.

5. In a low inflation alarm system for a pneumatic tire being used on a wheel, an inner tube in said tire, a high pressure gas reservoir carried by the wheel, an audible alarm instrument operable by gas pressure from said reservoir, a valve operably connected to said reservoir between said reservoir and said instrument, springy means tending to open said valve, a pressure plate bearing against said inner tube and against said valve opening means, effective to keep the valve closed when a safe pressure exists in said tube.

6. A low inflation alarm structure for pneumatic tires being operated on road wheels comprising a high pressure gas containing reservoir mounted on the wheel between the hub and tire, an alarm instrument operable by the gas from the reservoir upon release of the gas to flow into the alarm, a valve positioned between said reservoir and said instrument controlling such flow, a spring tending to open said valve and a plate member positioned to sustain spring pressure on one of its sides and bear against the air container of the tire with its opposite side, effective to keep the spring from opening the valve when safe pneumatic pressure exists within the tire.

RICHARD G. MILLER.